358-69. OR 2,657,257 SR
SEARCH ROOM

Oct. 27, 1953 A. LESTI 2,657,257

COLOR TELEVISION RECEIVER

Filed April 27, 1951 6 Sheets-Sheet 1

INVENTOR.
Arnold Lesti

INVENTOR.
Arnold Lesti

COLOR TELEVISION RECEIVER

INVENTOR.

Arnold Lesti

COLOR TELEVISION RECEIVER

Filed April 27, 1951 6 Sheets-Sheet 4

INVENTOR.

Arnold Lesti

INVENTOR.
Arnold Lesti

Oct. 27, 1953 A. LESTI 2,657,257

COLOR TELEVISION RECEIVER

Filed April 27, 1951 6 Sheets-Sheet 6

INVENTOR.

Arnold Lesti

Patented Oct. 27, 1953

2,657,257

UNITED STATES PATENT OFFICE 2,657,257

COLOR TELEVISION RECEIVER

Arnold Lesti, Nutley, N. J.

Application April 27, 1951, Serial No. 223,192

14 Claims. (Cl. 178—5.4)

This invention relates to a method and system for obtaining color pictures in television receivers. The receiving system may be adapted to receive signals from color television transmitting stations whose color signals are either sent simultaneously on separate carriers or sequentially on the same carrier. Separate picture information is sent for each of the primary colors of the color system. This form of color television transmission is well known to the art and an object of this invention is to provide improved color television receivers to operate on signals from such stations.

Color television receivers adapted to operate on signals from such transmitting stations based on previous art do not function in a manner which is free from objections. Receiving systems of this type proposed heretofore are based on either continuously moving mechanical components such as color discs which are objectionable especially for the large picture sizes, or in the electronic systems known to the art at present there is difficulty in maintaining correct color registration, in obtaining adequate brightness of illumination, and in holding accurate alignment of the electron beam of the cathode ray picture tube.

An object of the present invention is to provide a simple improved stable fully electronic color television receiver which does not require any continuously moving mechanical component, which will give excellent color registration, which will provide brightly colored pictures, and which does not require critically aligned components.

An important object of this invention is to produce a brightly colored picture by allowing the electron beam of the cathode ray picture tube to remain on the screen for the maximum possible time. Aperture masks to block the electron beam are unnecessary and avoided. The screen area is fully utilized. Full light intensity is produced at the phosphor source without filtering.

There are three general methods which are used to send color information. These are called the field sequential, line sequential, and dot sequential systems. Three primary colors are generally used which are red, blue, and green. In the field sequential system the colors are switched after every field, or the time taken to scan the picture from top to bottom. In the line sequential system the colors are switched after the scanning of every horizontal line, and in the dot sequential system the colors are switched after every dot. Interlaced scanning is also generally used with the above. This means that not all picture elements are scanned in a given field and that slightly different scanning over from four to six fields, depending upon the system, is needed to cover all picture elements and all colors, and thereby build one color picture.

It is an object of the present invention to provide an improved color television receiving system which will operate with any of the above methods and other methods.

In accordance with certain features of this invention there is utilized a cathode ray television receiving tube in which there are three types of phosphors deposited on the screen in separate spatial relation to each other but contiguous. There is a phosphor for each of the primary colors. One of the phosphors has the luminescent property of emitting red light, another blue light, and the third green light when bombarded by the electron beam. The screen will emit any desired one of the primary colors by moving the electron beam to those positions which will give the desired color. The entire screen is filled with phosphors without any gaps.

An important feature of this invention is to cause the deflection of the electron beam in the cathode ray picture tube towards the desired color producing areas of the screen by a feedback path which includes the light emitted when the electron beam bombards the screen. Light sensitive devices are provided which are responsive to the light of the proper color and test the light actually emitted and will direct the beam towards the correct color producing areas of the screen, and if the electron beam tends to move off of the proper color producing areas, the feedback path involving the said light sensitive devices will correct the electron beam and direct it towards the desired color producing areas of the screen.

In this connection a further feature of the present invention is to provide three light sensitive elements each equipped with a light filter allowing it to be responsive only to the primary color to which it corresponds, and to provide means for electronically switching the light sensitive elements in the color control circuit in accordance with the color to be emitted. To produce a given color those light sensitive elements are switched into service which are responsive to color whose combination forms the color complement of the given color.

Another object of this invention is to enable either field, line, or dot sequential color television receiving systems to be used in which adaptation of light controlled feedback to the respective system includes the principle of switching the light controlled feedback path at either the field, line, or dot repetition rates.

In one version of this invention the object is to cause the electron beam to be shifted slightly in the vertical direction to the correct color producing areas of the screen which take the form of primary color producing substantially horizontal parallel areas. Such deflection is accomplished by auxiliary electrostatic deflection plates in one adaption, by a separate deflection coil in another, and by superimposing deflection control voltages on the regular deflection systems in still another adaptation of this invention.

Another object of this invention is to control light producing ability by an inverse feedback path which includes a light beam from the light generated to lower this ability with feedback and to increase it without feedback to produce light of a specified color; the ability is thereby made high for the desired color and low for the undesired colors.

In accordance with certain features of this invention the light sensitive elements take the form of photoelectric tubes with color filters placed back of the cathode ray picture tube in such a position so as receive part of the light emitted in the back of the phosphor screen and thereby test the actual light emitted. Transparent portions in the picture tube are provided to allow light to reach the photoelectric tubes. In still another version of this invention the photoelectric tubes are placed inside of the cathode ray tube itself, and in a further version the photoelectric tubes are placed in front of the cathode ray tube but out of the way of the viewer.

A further detailed object of this invention is to provide gate circuits and novel associated circuitry to switch the feedback paths in and out of service in an efficient manner. In one version such gate circuits normally close the feedback paths while in another version they normally open the paths. In this connection a still further detailed object of this invention is to provide simple gating circuits which can operate at high speeds but which will not send the keying signals into the feedback circuit proper.

A further object of this invention is to utilize the principle of feedback on a light beam for operating the dot sequential system efficiently by causing the electron beam to be given added or subtracted horizontal motion to cause it to stay longer on the required color producing areas of a triple set of contiguous phosphor areas, one for each of the primary colors. The said color areas being laid out in substantially parallel vertical strips on the screen surface of the cathode ray picture tube.

A further object of this invention is to obtain color television pictures from standard types of cathode ray picture tubes used in conjunction with a translucent or transparent screen having the primary colors in the transparency or translucent material laid out in a manner similar to the color phosphors described hereinabove. The standard white picture on the picture tube is projected on the said screen by standard optical means and photoelectric tubes with light filters receive the light from the picture tube after having impinged upon the screen. The operation is otherwise similar to that given for the phosphor color screen in the cathode ray picture tube.

The above mentioned and other features and objects of this invention and the manner of attaining them will become more apparent and the invention itself will be best understood by reference to the following description of an embodiment of the invention taken in conjunction with the accompanying drawings in which:

Fig. 1 is an overall diagram of the system using auxiliary electrostatic deflectors in the cathode ray picture tube for color control, and photoelectric tubes with color filters.

Fig. 1A is a front face view of the cathode ray picture tube shown in Fig. 1, which is on the line 1—1. Horizontal color phosphor areas are shown. Fewer of these areas are shown than would actually be used in order to avoid excessive detail in the drawing.

Figures 1, 1A:
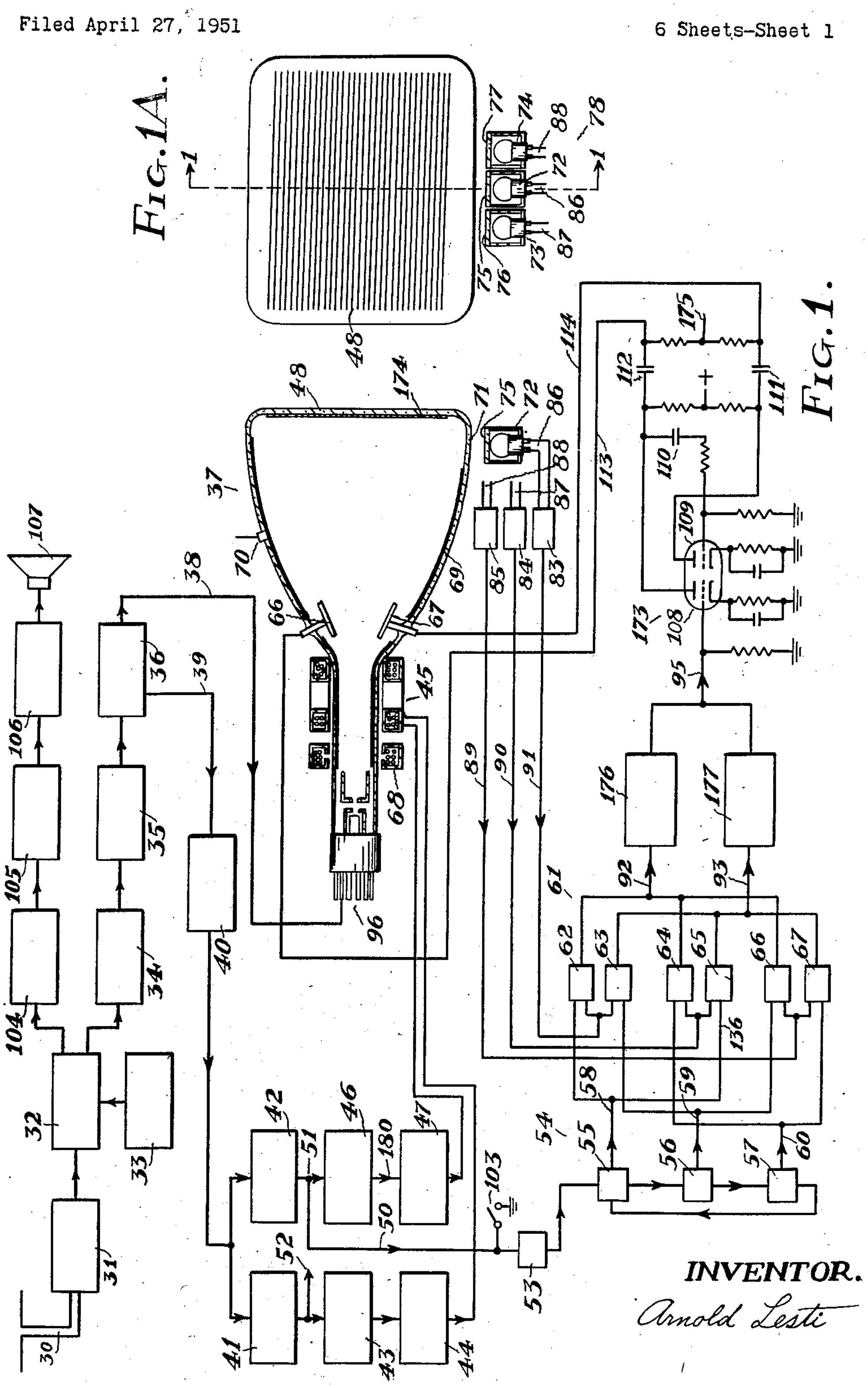

Referring to Fig. 1, the antenna 30 is coupled to the radio frequency selector 31. This, in turn, connects to the mixer and first detector 32 which is also coupled to the local oscillator 33. In accordance with the well known operation of these units the mixed output is fed to the picture intermediate frequency amplifier 34 which feeds into the second detector 35. The output of the latter drives the video amplifier 36, which in turn drives the cathode ray picture tube generally represented by 37 through conductor 38. The signals going through are standard except as explained hereinbelow. If the field sequential color system is being received the signals fed to the picture tube will represent a given one of the three primary colors in an entire field; the color represented is changed after every field. For the line sequential color system the color representation by the signal is changed after every horizontal line, while for the dot sequential system the color representation is changed after every dot. For the cathode ray picture tube standard sources of voltage, not indicated, are supplied via the pin connections 96.

Driven from a portion of the video amplifier in a known and standard manner by conductor 39 is the synchronizing separator 40 which, in turn, drives the horizontal synchronizing separator 41 and the vertical synchronizing separator 42. The horizontal synchronizing separator drives the horizontal deflection generator 43 which, in turn, drives the horizontal deflection amplifier 44. The latter is connected to the horizontal deflection coils of the deflection yoke 45. The vertical synchronizing separator 42 drives the vertical deflection generator 46, which, in turn, drives the vertical deflection amplifier 47. The latter is connected to the vertical deflection coils of the deflection yoke 45. The operation of the above circuits is standard. The action of the vertical and horizontal circuits produces a raster on the screen 48 of the cathode ray picture tube 37, while the electron beam is modulated in intensity by the signal voltages on conductor 38.

In Fig. 1 there is indicated a conductor 50 taken off from the output conductor 51 of the vertical synchronizing separator 42. The connection will permit the circuit as shown in Fig. 1 to operate for the field sequential color system. On the other hand, if conductor 50 is disconnected from conductor 51 and connected to conductor 52 from the horizontal synchronizing separator 41, the circuit as shown in Fig. 1 will operate for the line sequential color system. Assume for the present that conductor 50 is connected as shown, then there will be positive pulses delivered to conductor 50 from the vertical synchronizing separator 42, which occur at the end of every vertical scanning or field. These are standard pulses which are normally used to drive the vertical deflection generator 46. These pulses on conductor 50 are used to control the color switching circuit by being applied to ring driver 53. The output of this driver will cause the ring circuit generally represented by 54, and consisting of the three stages 55, 56, and 57, to step from one stage to the next after the occurrence of every pulse on conductor 50. If, for example, stage 55 is operative, the occurrence of a pulse on conductor 50 will render stage 55 inoperative and stage 56 operative. The next pulse will render stage 56 inoperative and stage 57 operative, while on the next pulse stage 57 will be rendered inoperative while stage 55 again becomes operative, thus starting the cycle over again. This type of ring circuit, described in detail hereinbelow, is well known to the art and is used here in a novel arrangement with color controlling circuits. While conductor 51 is shown connected directly to conductor 50 it is possible to insert between conductor 51 and conductor 50 a circuit which is similar to what in the art is called an automatic frequency control circuit (A. F. C.) and which is extensively used on horizontal deflection circuits. In this case such a circuit would operate at the field repetition rate and it would stabilize the pulses applied to ring driver 53 and it would eliminate the effects of spurious noise pulses upon the ring circuit. The same applies to the connection from conductor 52 to 51 for the horizontal circuit, but in this latter case the A. F. C. circuit would operate at the line repetition rate. Ring stage 55 has output conductor 58 which delivers a positive going voltage when ring stage 55 is in the operated condition and not otherwise. Similarly, conductor 59 will carry a positive pulse when ring stage 56 is operative, and conductor 60 will carry a positive going pulse when ring stage 57 is operative.

There are color control gates generally represented by 61 to permit the switching of the outputs of photoelectric tubes 78 (Fig. 1A), to the auxiliary vertical deflection system consisting of amplifier 176, reversing amplifier 177, deflection amplifier 173, and auxiliary electrostatic vertical deflection electrodes 66 and 67 installed in the interior of cathode ray picture tube 37. This picture tube is equipped with a regular focussing coil 68. The cathode ray picture tube has a colloidal graphite coating 69 on its interior surface as shown with electrode 70 to connect to a standard source of high positive anode potential of the tube. There is a clear transparent portion 71 in the tube to permit light emitted from the back of the screen 174 to go through transparent portion 71 to photoelectric tubes generally represented by 78, and consisting of photoelectric tube 72 with green filter 75, photo electric tube 73 with blue filter 76, and photoelectric tube 74 with red filter 77. Light rays caused by bombardment of the screen 174 by the electron beam will go through transparent portion 71 of tube 37 and through the color filters 75, 76, 77, and into the respective photoelectric tubes 72, 73, 74. The light that goes through to the photoelectric tubes will cause passage of current through the tube from a fixed source of voltage, circuit of which is described in detail hereinbelow. The current produced is proportional to the intensity of the light striking the photoelectric tube.

Figure 5:
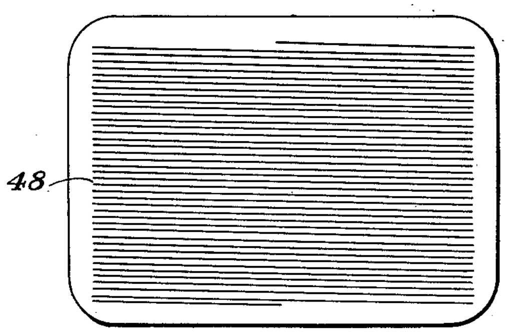
Fig. 5 is a larger front face view of the screen of the cathode ray picture tube with horizontal color producing areas.
Figure 7:
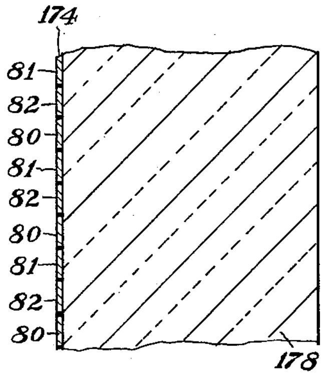
Fig. 7 is a sectional view on the line 7—7 of Fig. 6.
Figure 6:
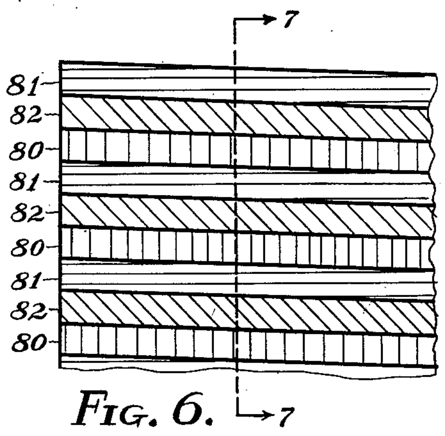
Fig. 6 is an enlarged view of a small portion of the screen of Fig. 5 showing the contiguous color producing phosphor areas.

The screen 174 is composed of substantially horizontal contiguous areas of color producing phosphors, indicated in Fig. 1A, Fig. 5, and in detail in Fig. 6, and Fig. 7 in which glass portion 178 of the picture tube is shown. One of these areas has a red producing phosphor, the next one below is a blue producing phosphor while the one immediately above the red area is a green producing phosphor. These areas are deposited on the screen surface of the interior of picture tube 37 in parallel horizontal strips which have a downward slant substantially equal to the downward slant of the cathode ray beam when it moves across the screen from left to right. Precision of position is unnecessary, however. The number of horizontal color strips is greater than three times the number of horizontal lines necessary to build up one complete picture. The downward space sequence of color producing areas may be red, blue, green, red, blue, green, and etc., as shown in Fig. 6, and Fig. 7. The numeral 80 represents red producing phosphor or any other suitable red luminescent material, 81 represents blue producing phosphor, and 82 represents green producing phosphor. The downward sequence of color producing strips could also be red, green, blue, red, green, blue, and etc.

Figures 8, 13, 19:
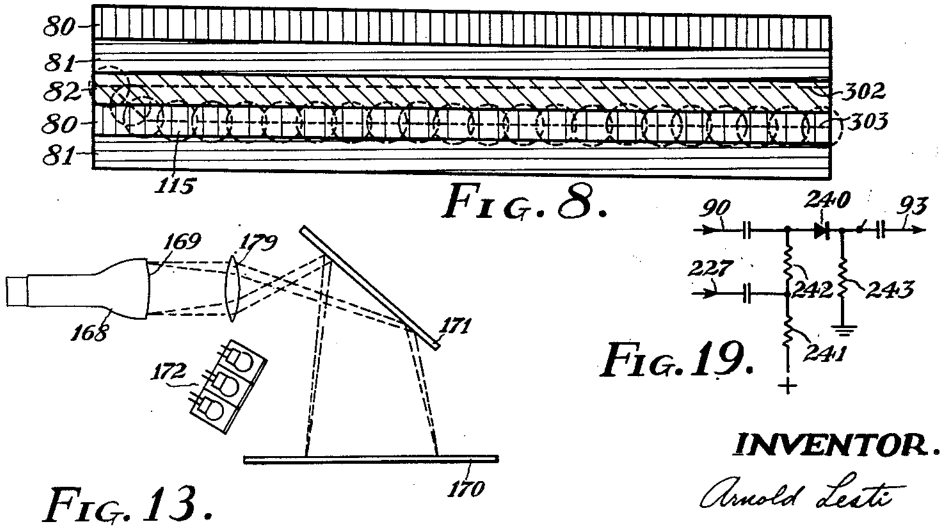
Fig. 8 is an enlarged view of five horizontal color producing phosphor areas, showing how an electron beam wrongly strikes the green area at the start of the horizontal motion and the path the beam travels on to reach the correct red light producing area. This is applicable to field sequential and line sequential systems.
Fig. 13 is a skeletonized view of a projection, television system showing the path of the light rays, and photoelectric tubes.
Fig. 19 is an alternative gate circuit for Fig. 17.

Referring again to Fig. 1 and to Fig. 1A, if for example stage 55 of the ring circuit 54 is operative positive gating potential is applied to downward gate 62 and upward gate 65. The positive potential from stage 55 will remain active for an entire field, when conductor 50 is connected to conductor 51. Assume that this is the case, then downward gate 62 will allow passage of voltages generated at photoelectric tube 72. These voltages are due to green light emitted from the screen 174, which will pass through green filter 75 and through no other filter. These voltages are applied through to conductors 86, amplifier 83, conductor 91, and gate 62. Gate 62 will allow passage of the voltages to conductor 92, amplifier 176, common conductor 95, auxiliary deflection amplifier 173 whose output is applied in push-pull to the auxiliary vertical deflection electrodes 66 and 67. In a similar manner the voltages generated by photoelectric tube 73 due to blue light going through blue filter 76 are applied to conductors 87, amplifier 84, conductor 90 and to gate 65. Since upward gate 65 is keyed by a positive voltage from stage 55 it will allow passage of the voltages from the blue light controlled photoelectric tube to conductor 93, reversing amplifier 177, common conductor 95, and to the auxiliary deflection system as described hereinabove. It is to be noted that the voltages delivered by reversing amplifier 177 are in opposite phase to the voltages generated at common circuit point 95 from those delivered by amplifier 176. Voltages applied to amplifier 176 due to increasing light intensity will cause the auxiliary electrostatic deflection electrodes to move the electron beam downward, while the same voltages applied to the reversing amplifier 177 will be reversed in their effects on the auxiliary deflection electrodes and cause the electron beam to move in the opposite direction, namely, upward. With downward controlling gate 62 and upward controlling gate 65 rendered operative by positive voltage on conductor 58 the following will take place:

If the electron beam strikes the green producing phosphor area 82, Fig. 8, at the beginning of the horizontal scanning period with the video signal causing the electron beam to be on, voltage will be delivered through gate 62 from the green color controlled photoelectric tube 72. This will cause the auxiliary deflection system to move the beam additionally in the downward direction and this motion will continue until the beam goes almost completely off of the green area and on to the red area in case the beam size is smaller than the width of the color producing strip. If the beam size is larger than the width of a color producing strip, the beam will move downward until some portion of the beam crosses the red producing area and goes into the blue producing area 81. Refer to Fig. 8 in which the circles 115 represent various positions of the beam as it moves from left to right under the conditions assumed hereinabove. When portions of the electron beam go into the blue producing region 81 the blue light generated will cause the blue light controlled photoelectric tube to generate voltages which are passed by upward gate 65 onto the reversing amplifier 177 and to the auxiliary deflection system. This would cause deflection of the electron beam relatively in the upward direction if there were no voltages due to the green light present. However, because the beam is wider than a color producing strip it will strike the blue area and partially enter it while portions of the beam are still on the green producing area. Therefore, voltages will be passed by amplifier 176 to conductor 95 in opposite phase to the voltages passed by reversing amplifier 177 to conductor 95, and there will be a subtraction of their values at conductor 95. The electron beam, illustrated in Fig. 8, will enter the blue light producing region until the voltage due to this blue light cancels a certain part of the voltage due to the small amount of green light at conductor 95. When this happens the beam will stop moving downward. It will continue its horizontal movement with the entire width of the red producing area covered by the beam, and small portions of the blue and green areas also. The net color of the light emitted will be red. The small amount of green and blue light will combine with a similar amount of red light to give a slight white light superimposed on the bright red. The net effect is bright red light.

As the beam moves horizontally its general direction, if there were no feedback control, would be the same as that of the color producing strip but not exactly. In Fig. 8, dotted line 302 indicates a possible path without feedback control. Dotted line 303 indicates the center of the path with color control. Any tendency for the electron beam with color control to move off of the right color strip as determined by the ring circuit stage then in the operative condition will be corrected by voltages generated at the photoelectric tubes. For example, if the beam has a tendency to move off of the red color producing strip in the upward direction, more of the green color producing area will be occupied. Therefore, a condition is established which causes a greater output from downward gate 62 than from upward gate 65, and the net voltage at conductor 95 will increase in the direction of the sense given by gate 62 which causes the auxiliary deflection system to move the electron beam relatively in the downward direction thereby correcting for any tendency of the beam to move upward. Similarly, if the beam has a tendency to move off of the red color producing region in the downward direction, the effect will be the opposite to that described hereinabove. In this latter case the output of gate 65 will be greater than that of gate 62 because there will be more blue light produced than green. Therefore, more voltage will be delivered to conductor 95 of a polarity to cause upward movement of the electron beam to correct for any tendency to move downward. In this manner the center of the electron beam is kept on the center of the red producing area as the electron beam moves horizontally across the screen, with very minor deviations to correct for tendencies to move off. This control is exercised even for very weak beams.

The description given immediately hereinabove assumes that the beam strikes the green color producing phosphor strip when it started its horizontal movement at the left side of the screen. If it had started on the blue strip, however, it would be moved upward towards the red color producing strip by the predominant upward moving voltages generated by the presence of blue light, until the beam center occupies the red light producing region and until portions of the beam moved into the green producing region which would then produce voltages to partially cancel the voltage due to the blue light and maintain the electron beam on the red region.

If the electron beam starts its horizontal movement on the left side exactly between the green and blue regions when the ring circuit is set for the red color, this improbable condition would be one of unstable equilibrium because the voltages due to the two colors will be tending to move the beam in opposite directions such that once one of the directions is started it will build up and continue, and then the case can be treated as one of the cases already described hereinabove.

While the electron beam repeatedly sweeps across the screen from left-to-right for every horizontal line, the regular vertical sweep motion also takes place. The auxiliary vertical control circuit superimposes its effects upon the existing standard vertical sweep motion and only causes such minor movements of the electron beam as to keep it on the nearest correct color producing area across the screen. These color areas have the same general direction as the beam itself in order to reduce the amount of correction that is required of the color control circuit. Modulation by the video signal of the electron beam can take place while color control is maintained. This will be taken up in more detail hereinbelow.

In the description given hereinabove it was assumed that stage 55 of the ring circuit 54 was operative. This stage controls the production of red light by the cathode ray tube and while it is operated the picture tube will emit a red colored picture. If field sequential color control is used with conductor 50 connected to conductor 51, stage 55 will remain on for one field and during its occurrence the color will be red. The next synchronizing pulse on conductor 50 will cause stage 55 to become inoperative while stage 56 of the ring circuit will become operative. Gates 62 and 65 will be switched off and gates 63 and 66 will be switched on. Gate 63 controls upward movement for the green color, while gate 66 controls downward movement for the red color. This will cause the electron beam to center on the blue color producing strips and this color will be produced while stage 56 is operative, which is the field following the red one.

When the next vertical synchronizing pulse occurs on conductor 50 stage 56 will be rendered inoperative while stage 57 will be rendered operative. This will cause the switching off of gates 63 and 66 and the switching on of gates 64 and 67. Gate 64 controls the downward movement of the electron beam for the blue color, while gate 67 controls the upward movement for the red color. This will cause, in a manner analogous to that described for the case when gate 55 is operative and in a manner analogous to the case when gate 56 is operative, the movement of the beam towards the green producing areas of the screen and a green colored picture will be produced in this field. Upon the occurrence of the next vertical synchronizing pulse from conductor 50 to the ring circuit, stage 57 is rendered inoperative while stage 55 will be rendered operative for control of the red color, thus starting the action over again. The color pictures of each field blend together and give the desired composite color effect.

For the reception of color television pictures based on the line sequential system conductor 50 is not connected to conductor 52 as shown in Fig. 1, but it is disconnected from conductor 51 and connected to conductor 52 which supplies synchronizing pulses occurring at the horizontal line rate. With this connection the ring circuit 54 is stepped along after every horizontal line, switching gates 61 at the same rate. This will cause the electron beam to move on to a distinct one of each of the three primary color producing horizontal strips for each horizontal scan. Color changes for each successive horizontal scan. The operation of the feedback color control circuit is identical to that described for the field sequential case except that the colors are switched after every horizontal line instead of after every field.

The synchronizing pulse rates occurring on conductor 50 are of such a frequency that the ring and switching circuits can easily cope with them. The frequencies range from about 60 to 144 pulses per second in some systems for the field synchronizing pulse rates, and from 15,750 to 29,160 pulses per second for the horizontal synchronizing pulse rates. Other rates in these ranges or somewhat higher values can be utilized by ring and switching circuits of the type described hereinabove.

For the dot sequential system the synchronizing pulse rates are much higher. For this system conductor 50 will not be connected to either conductor 51 or 52, but it will be connected to a circuit shown in Fig. 20. It will be assumed that the dot sequential color system is synchronized by sending a burst of the color synchronizing signals on the back porch of the horizontal synchronizing pedestal as is done in practice for certain dot sequential systems. The video signal is applied to a gating circuit 97 by conductor 39, and this circuit is keyed on at the horizontal pulse rate by conductor 52. Its output conductor 101 will have the color synchronizing bursts of frequencies. These are applied to a high-Q tuned circuit 98 which is excited by these frequencies and maintains oscillations during the periods when these exciting frequencies are not present. In accordance with established practice circuit 98 may be considered as producing a steady frequency on its output of a value which occurs in burst only on its input conductor 101. It may take various well known forms. The output of 98 on conductor 102 is fed to amplifier 99 which has an output which connects to conductor 100. It is this conductor which has a steady dot switching frequency which can be applied to conductor 50 of Fig. 1, to drive the ring circuit 54 at the dot sequential color switching rate. For this case the ring circuit and the gate circuit 61 must be specially constructed for operation at high frequencies. The operation for the dot sequential system as far as color reproduction is concerned is based on the use of color control on the horizontal deflection system instead of the vertical system, and used in conjunction with a screen composed of vertical color producing phosphor strips. Because of the high-speed switching rates required for the dot sequential systems, a special arrangement is preferred for it which is described in detail hereinbelow in another section of this specification.

In Fig. 1 the ring circuit may start up in any one of its three positions. It must be correctly phased so that when a given color is switched on by it, the video signal applied to cathode ray picture tube via conductor 38 corresponds to the color that is being produced by the tube at that time. If the color does not correspond in phase with the video signal, switch 103 may be closed momentarily and then opened again manually several times if necessary, until the phase of the color corresponds with that of the video signal. Switch 103 momentarily short circuits conductor 50 and stops the ring circuit. When the switch is opened again the ring circuit will start again, but by probability, in a different phase. If this is tried several times the correct phase will be attained. Another way of doing this is to close momentarily on to conductor 50 a circuit which will place an extra voltage pulse thereon. A maximum of two tries will suffice for this latter method.

In order to complete the system Fig. 1 is shown with the audio system consisting of sound intermediate frequency amplifier 104, second sound detector 105, audio amplifier 106, and loud speaker 107. Of course the intercarrier sound system may be used if desired instead of the one shown.

It is obvious to those skilled in the art that the color system described hereinabove may be applied to a radio reception system in which three radio receivers are used instead of one as shown in Fig. 1. Each radio receiver would receive signals corresponding to one color. There would be three video outputs, one for each color. Each video output would be fed to a gate of three gates. The three gates would have a common output applied to the control electrode 38 of cathode ray picture tube 37. The gates will pass video voltages when keyed. One of the said three gates would be keyed on by a lead such as conductor 58 of the ring circuit 54, another by conductor 59, and the third gate would be keyed on by conductor such as 60. Thus the keying on of the gates would occur in synchronism with the occurrence of the corresponding colors in the picture tube screen. The synchronizing pulses could be extracted from the signals of one of the carriers. The system of Fig. 1 using one carrier and one receiver for the complete color television signal is preferred over the system using three separate carriers.

In Fig. 1 push-pull amplifier 173 consists of a twin triode tube with triode section 108 which receives signals on its grid from conductor 95. The reversed phased output signal of triode 108 is applied to the control grid of triode section 109 via network 110. The output of triode 109 is applied through condenser 111 to deflection electrode 67 of the cathode ray picture tube, while the output of triode 108 is applied through condenser 112 to deflection electrode 66. These two outputs are in push-pull and substantially 180° out of phase with each other. This is obtained in a standard manner from the single ended input on conductor 95. The electrostatic deflection electrodes 66, 67 will aid each other in their deflection effects upon the electron beam which travels from the gun of the cathode ray tube to the screen. The electron beam is focussed by coil 68 and given standard vertical and horizontal deflection motions by deflection yoke 45 before entering the region where the auxiliary deflection electrodes 66, 67 exert their influence upon it. These electrodes are shown positioned in such a way that they do not block the path of the electron beam towards any portion of the screen 174. They are shown in the vertical position in Fig. 1. The horizontal distance to which they extend, while not shown, is at least equal to the distance of the region extending in the horizontal direction in which the electron beam normally moves at the auxiliary electrodes' distance from the gun.

High voltage anode connection 70 of picture tube 37 is connected to the high accelerating voltage source of standard design. It is preferable to also connect this same high voltage source to circuit point 175, thereby maintaining the potential of the deflection electrodes 66, 67 at the same potential as the colloidal conductive coating 69. The deflection electrodes 66, 67 thus contribute to the accelerating action on the electron beam that would be normally provided by the colloidal conductive coating if the electrodes were not present. In addition, the difference of potential between the deflection electrodes and the colloidal coating 69 is reduced to only the value of the actual color deflection signal from amplifier 173. This arrangement requires high voltage condensers 111, and 112, and high order of insulation for conductors 113, and 114. The arrangement shown in Fig. 1 with the auxiliary deflection electrodes 66 and 67 is a useful form when the color deflection system requires a higher bandwidth than could be conveniently taken care of by the deflection yoke 45. This is especially true for the dot sequential system of reception which is described in more detail hereinbelow. However, it is possible to use other forms of deflection of the electron beam for color control in which no auxiliary deflection electrodes, such as 66, 67, are required. These are described hereinbelow.

Figure 2:
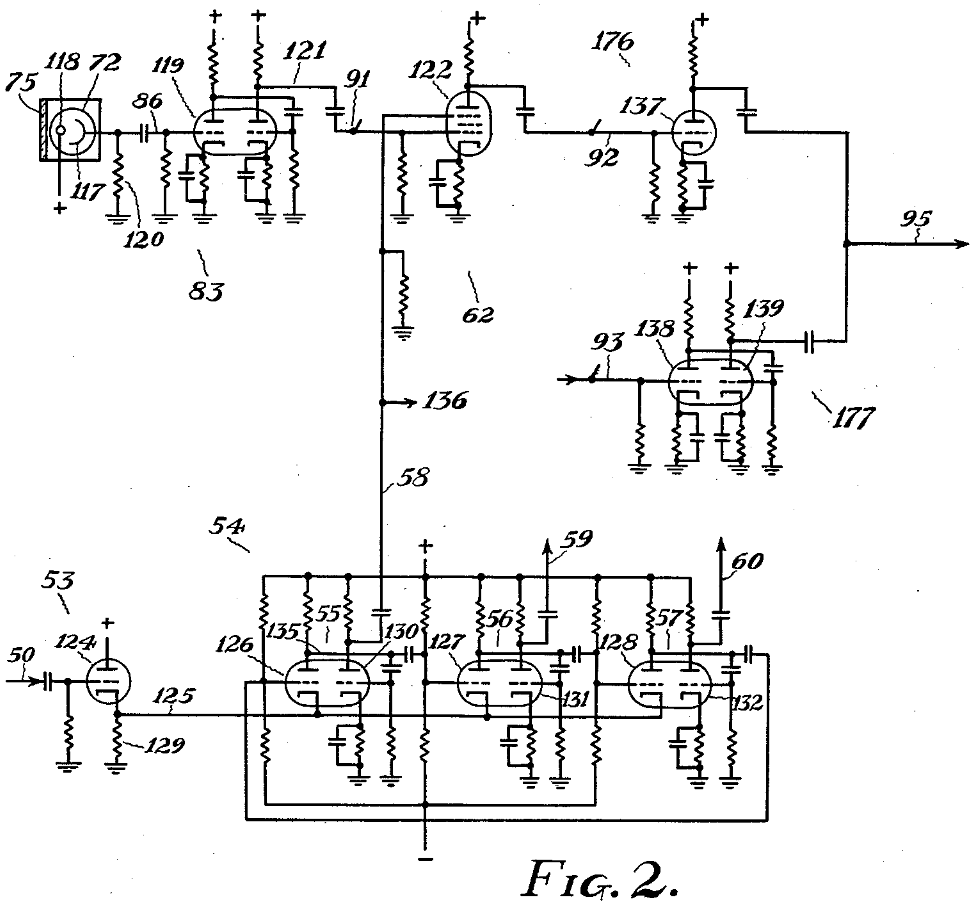
Fig. 2 is a detailed circuit of the ring counter and ring driver, a photoelectric tube circuit and amplifier, a gate circuit, amplifier, and reversing amplifier shown in block diagram in Fig. 1.

In Fig. 2 there is shown circuit details of one of the photoelectric tubes 72 and associated amplifier circuit generally represented by 83. The photoelectric tube 72 and light filter 75 for the green light is taken as a typical case, the others have identically the same type of circuit. The photoelectric tube has cathode 117 coupled to the control grid of amplifier tube 119 via conductor 86. The anode 118 of the photoelectric tube is connected to a source of positive potential. When the green light enters the green light filter 75 and reaches the cathode 117 electrons are emitted by the latter. These are attracted towards the anode 118 and a current flows through resistor 120 placing a positive potential on the cathode portion of that resistor with respect to ground. The increase of light entering the photoelectric tube will cause a positive going potential to be applied to the control grid of tube 119. In accordance with well known principles the tube amplifies and reverses the signal, which is then applied to tube 121, which in turn amplifies the signal further and delivers it to the control grid of tube 122 via conductor 91. Before taking up the action of tube 122, the ring circuit and ring driver 124 will be described.

Ring driver tube 124 receives the synchronizing pulses described hereinabove on conductor 50. These positive going pulses are applied to the grid of cathode follower tube 124. The cathode of this tube is connected to ground through a cathode resistor 129, and to the cathodes of amplifier triodes 126, 127, 128, which are indicated in a half-section envelope with other triodes. Where two triodes are shown in one envelope in this and other circuits, standard separate envelopes may be used. The tubes in the various drawings are shown without the cathode heaters in order to avoid excessive details in the drawings, but it is understood that heaters are provided for all tubes and connected to a suitable standard source of voltage. When the ring circuit is turned on by applying anode, heater, and biasing voltages to it, anyone of the various tubes 126, 127, or 128 may conduct from the plate to its cathode. Only one of these tubes will conduct at one time because the current passing through the conducting tube will place a positive voltage on its cathode of sufficient magnitude to bias the other tubes to the plate current cut-off condition. Assume that tube 126 is conducting. Then its plate or anode will be at a relatively negative potential with respect to the anode supply voltage. When a positive synchronizing pulse is applied to the control grid of tube 124 via conductor 50, a positive going pulse voltage appears on conductor 125 which raises the voltage in the positive sense on the cathodes of tubes 126, 127, 128. This voltage is sufficient to place any conductive tube in the plate current cut-off condition. Since it is assumed that tube 126 is conducting, then this tube will be cut-off. When this happens a positive going voltage pulse is established on its plate which is transferred to the control grid of the next tube in line, namely, tube 127. As is the practice in these circuits the pulse applied to tube 124 is comparatively short and will disappear before the pulse going from tube 126 to 127 disappears. This may be done by a suitable choice of circuit constants. The positive pulse on the control grid of tube 127 will cause this tube to conduct and prevent the other tubes in the ring circuit from conducting. This action constitutes stepping from stage 55 to stage 56 of the ring circuit referred to in connection with the description given hereinabove for Fig. 1. In a similar manner, the next occurring positive pulse on conductor 50 will cause the cut-off of tube 127 and the conduction of tube 128 which corresponds to the stepping from stage 56 to stage 57. The next pulse on conductor 50 will cause tube 128 to cut-off and tube 126 to conduct which corresponds to the stepping from stage 57 to stage 55, thus starting the cycle of triple stepping actions over again. The action may start in a similar manner regardless of which tube conducted first when the operating voltages were turned on. Pentode tubes may be used instead of the triodes shown in the ring circuit. The grid of each of the tubes is provided with a biasing network connected to a suitable source of positive and negative voltage. The ring circuits illustrated herein are shown by way of example. Other similar circuits well known to the art may be used.

Associated with each of the tubes 126, 127, and 128 there is another tube. Ring tube 126 is coupled on its plate circuit via a condenser to the control grid of tube 130 which reverses the voltage pulses from the plate circuit of tube 126 and applies them to conductor 58. This latter conductor is connected to the suppressor grid of tube 122. Tubes 126 and 130 together constitute stage 55. Every time tube 126 is conducting there is a positive voltage applied to the suppressor grid of tube 122 via conductor 58 causing tube 122 to be rendered conductive of plate-to-cathode current and operative as an amplifier. When tube 126 is not conducting during the cyclic stepping action, a negative pulse is applied to the suppressor grid of tube 122 via conductor 58. This will insure that tube 122 is in the plate current cut-off condition and inoperative as an amplifier. As indicated in Fig. 2 with the photoelectric tube 75 for the green color, and associated amplifier 83, gate tube 122 corresponds to gate 62 shown in Fig. 1, so that tube 122 is generally represented in Fig. 2 as 62, while tubes 126 and 130 are generally represented by 55, being that stage of ring circuit 54. Conductor 58 is also connected to conductor 136 which in turn connects to the suppressor grid of another tube similar to tube 122 but not shown and which corresponds to gate 65 of Fig. 1.

In a similar manner tube 127 is coupled to tube 131 whose output drives conductor 59. Both tubes 127 and 131 constitute stage 56. Conductor 59 goes to the suppressor grids of tubes similar to tube 122 and corresponding to gates 63 and 66. Also, tube 128 drives tube 132. Together they constitute stage 57. The output of tube 132 drives conductor 60 which goes to the suppressor grid of tubes similar to tube 122 and corresponding to gates 64 and 67. The operation of these circuits is similar to that described hereinabove in detail for stage 55 and gate 62 whose individual detailed circuits are shown in Fig. 2.

For each of the amplifiers 84, 85 shown in Fig. 1, there is a circuit similar to that shown in Fig. 2 between the photoelectric tube and the conductor 91. This circuit is indicated as amplifier 83 in Fig. 2. The output of gating amplifier 122, when it is gated on its suppressor grid by a positive voltage, is an amplified output of the signal occurring on conductor 91. The output of tube 122 is fed to conductor 92 which connects to tube 137 whose output is connected to conductor 95. Gates 64 and 66 are similarly connected to conductor 92. Gates 63, 65, and 67 are connected to conductor 93 which drives reversing amplifier consisting of triode 138 whose grid is coupled to conductor 93 and triode 139 whose grid is connected to the output of triode 138. The signal phase at the input of amplifier 177 is in-phase with its output, but relative to the output delivered by amplifier 176, its effects on deflecting the electron beam is reversed. The output of amplifier 177 is connected to conductor 95 as shown in Fig. 2 and in block diagram in Fig. 1.

Figure 17:
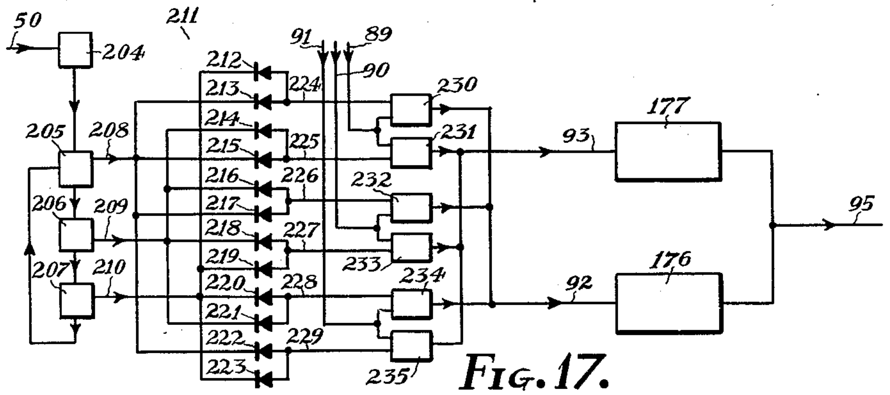
Fig. 17 is a block diagram of a color feedback control switching circuit in which the gates are normally adapted to pass control voltages.
Figures 22, 23, 24:
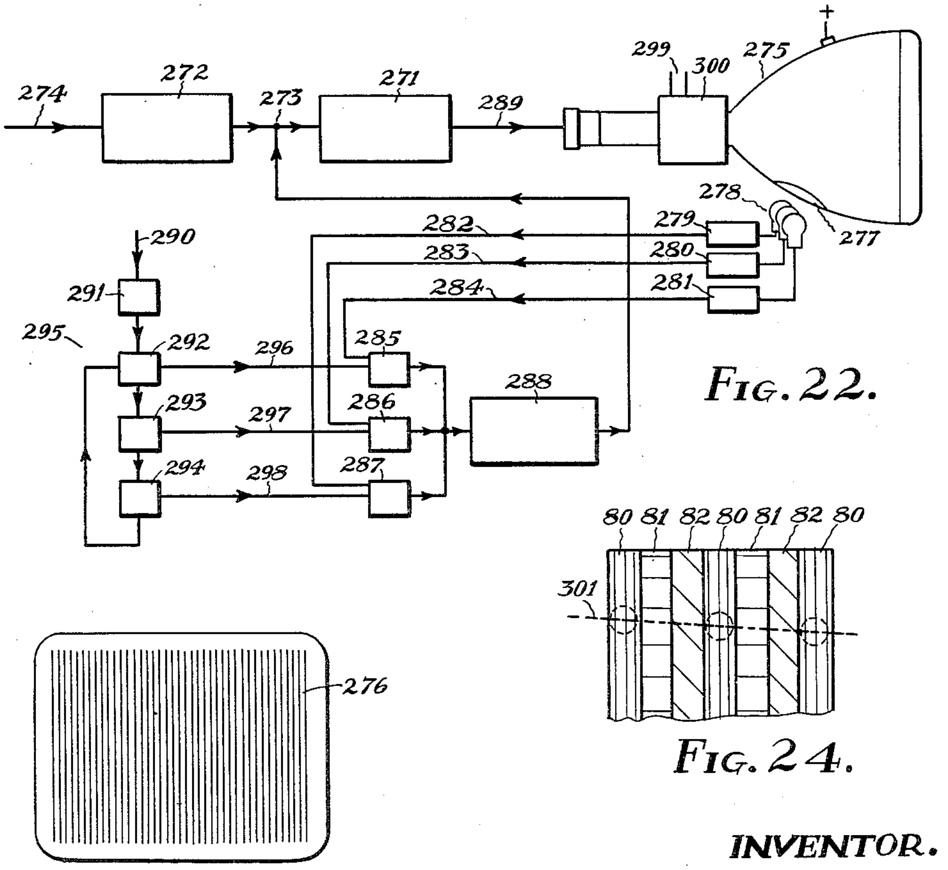
Fig. 22 is a block diagram of an inverse feedback system in which the feedback loop goes around the video amplifier.
Fig. 23 is a reduced front face view of the cathode ray tube showing the direction of color producing phosphor areas applicable to the circuit of Fig. 22.
Fig. 24 is an enlarged detail view of a portion of the screen surface of Fig. 23 showing the path of the electron beam therein.

While the tubes shown in Fig. 2 are mostly triodes, it is obvious that pentodes may be used in modified arrangements coming within the scope of the block diagram illustrated in Fig. 1. Wider frequency bandwidth, when needed for higher switching speeds and certain feedback requirements, as explained hereinbelow, can be accommodated by suitable amplifiers having pentode tubes. While Fig. 1 illustrates amplifiers 83, 84, and 85 one of which 83 is detailed in Fig. 2, these may be eliminated if photoelectric tubes are available with sufficient sensitivity, such as the electron-multiplier type or other types. If these amplifiers are eliminated the outputs of the photoelectric tubes 72, 73, and 74 would be applied directly to conductors 89, 90, 91 and fed directly into gates 62, 63, 64, 65, 66, and 67, or if the circuit of Fig. 17 is used, the gates would be 230, 231, 232, 233, 234, and 235, or if the circuit of Fig. 22 is used the gates would be 285, 286, and 287. The most economical procedure would be to eliminate amplifiers in circuits that are duplicated, and concentrate amplification in the common amplifier such as 173 shown in Fig. 1, which could be preceded by additional amplifying tubes. Amplifiers 176 and 177 could be reduced to the barest minimum which could take the form of one reversing tube for 176 and a direct path for 177. Of course, the arrangement shown in Fig. 1 is conservative and is well adapted for functional description.

Figure 3:
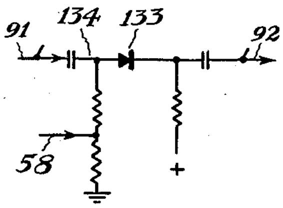
Fig. 3 is a simplified form of a gate circuit adaptable to Fig. 1.

While Fig. 2 shows a tube gate 122, it is possible to replace it with a rectifier gate of the type illustrated in Fig. 3. For this, the signals from the photoelectric amplifier on conductor 91 are fed to rectifier 133 through a coupling condenser. The other side of the rectifier is connected to a source of bias positive potential through a resistor. The rectifier conducts positively in the direction shown from 91 to 92. The bias potential prevents the passage of current through the rectifier when the positive voltage at circuit point 134 is less than the bias maintained on the other side of the rectifier. For signals whose positive peak amplitude is less than the bias on the rectifier an open circuit is presented by the rectifier and the passage of those signals through the rectifier to conductor 92 is thereby prevented. On the other hand, when positive keying pulses occur on conductor 58 of sufficient amplitude to exceed the bias of the rectifier and cause positive current to flow therethrough, the rectifier is rendered conductive for signal currents caused by signal voltages on conductor 91. The signal is thus allowed to pass through to conductor 92. It is essential that the negative voltage excursions due to the signal applied to the rectifier do not lower the net positive voltage below the bias voltage. This can be insured by making the positive keying voltage from conductor 58 sufficiently high. Conductor 58 connects to the ring circuit to the output of tube such as 130, while conductor 92 connects to amplifier 137.

Figure 4:
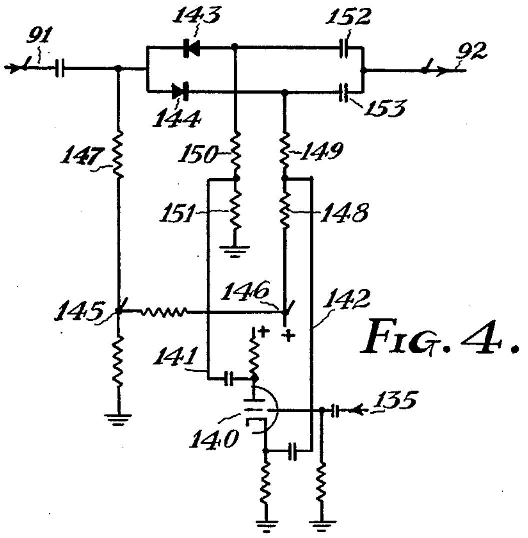
Fig. 4 is a balanced form of a gate circuit also adaptable to Fig. 1. As in Fig. 3 this circuit normally blocks passage of feedback control voltages.

An improved gate over that shown in Fig. 3 is illustrated in Fig. 4. The gate tube 122 and that of Fig. 3 cause the keying or gating pulses to be transmitted to the conductor 92 to effect the color deflection circuit. For the field and line sequential systems the keying takes place after every field and line respectively and therefore the transient effects of keying will only occur at these times when retrace takes place and the electron beam is shut off. No trouble would be expected from these gates because of the keying pulse. However, a superior circuit is shown in Fig. 4 which will suppress the keying pulse's effect on the output conductor. This circuit is adaptable for any of the systems and can be used as one of the gates such as 62. Of course, the dot sequential system requires keying after every dot so that a balanced gating circuit such as the one shown in Fig. 4 is especially suitable for this system. Referring to Fig. 4 the output of one of the ring tubes such as 126 is coupled by conductor 135 to the grid of tube 140 which replaces tube such as 130 in the ring circuit. Tube 140 has equal resistors on its plate and cathode circuits and will deliver pulse on conductors 141 and 142 of equal amplitude but of opposite polarity. Assume that tube 126 of the ring circuit is conducting, then a negative pulse will appear on the grid of tube 140 which will cause a positive pulse to appear on conductor 141 and a negative pulse on conductor 142. Rectifier 143 which will pass negative signals in the direction of conductor 91 to conductor 92, is biased positively in the same direction; therefore it will normally be nonconductive. The bias voltage is applied from positive circuit point 146, connected to a source of positive voltage, through a voltage dividing resistor combination to circuit point 145. The latter is at a positive potential with respect to ground. This voltage is applied to rectifier 143 through a resistor 147. Rectifier 144 conducts in a direction opposite to that of rectifier 143, and is biased by the voltage from circuit point 146 through resistors 148 and 149 with return circuit to point 145. The two outputs of tube 140 are applied to the rectifiers through the midpoint of resistors 148, 149 and 150, 151. The rectifiers will normally be open circuited or present a very high resistance to the passage of signal currents. With the positive voltage on conductor 141 due to the ring tube 126 being conductive, positive voltage is applied to rectifier 143 of a magnitude greater than its bias. Therefore, rectifier 143 will be conductive. In an analogous manner, the accompanying negative pulse on conductor 142 will cancel the positive bias voltage at the junction of resistors 148 and 149, and provide a net negative voltage at that point with respect to circuit point 145 thus permitting rectifier 144 to conduct. Under these conditions both rectifiers 143 and 144 are conducting and signals from 91 will be passed on to conductor 92 through both rectifiers. If the keying voltages exactly balanced the bias voltages, rectifier 144 would carry the positive parts of the signals while rectifier 143 would carry the negative parts of the signals. However, if the keying signals exceed the bias, both rectifiers will carry both positive and negative signals. The keying voltages at conductors 141 and 142, being opposite in polarity but equal in magnitude, will be applied to the condensers 152 and 153 and the currents sent through these condensers to conductor 92 and corresponding voltages at this point will be equal and opposite in value and thus cancel out. The net result is that no keying pulses reach the deflection system, but the color signal voltages from conductor 91 are not cancelled, and so will go on to the color deflection system.

In Figures 1 and 1A the photoelectric tubes are shown behind a transparent portion 71 of the cathode ray tube. This transparent portion would take the form of a clear opening in the colloidal graphite which is customarily used around the inside of the tube. The glass of the tube would be transparent and allow light to go through. The transparent portion of the tube could extend farther back than is shown in Fig. 1, like for example, the arrangement shown in Fig. 16 in which the transparent portion is farther behind the screen and allows less difference in the distance of the path for the light rays from different portions of the screen to the photoelectric tubes. If the back of the tube is made of metal, transparent glass portions may be inserted in the metal to allow the light to pass.

Figure 9:
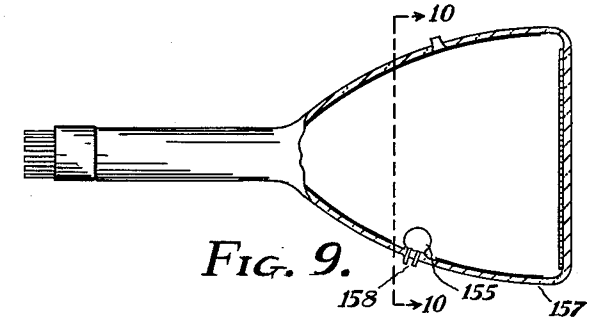
Fig. 9 is a reduced part sectional view of a cathode ray picture tube with photoelectric tubes inside of the tube.
Figure 10:
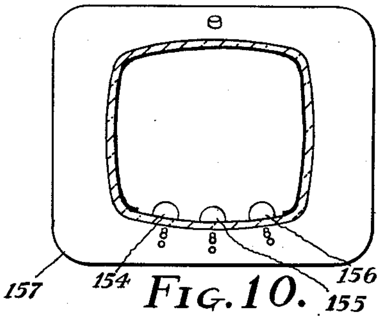
Fig. 10 is a sectional view on the line 10—10 of Fig. 9.

Another arrangement is shown in Figures 9 and 10, in which the photoelectric tubes are placed inside of the cathode ray picture tube 157.

There are three photoelectric tubes 154, 155, 156 with terminals such as 158 brought out through the glass to the outside of the picture tube. The photoelectric tubes have glass envelopes of the corresponding primary color to act as the color filter, or portions of the photoelectric tubes may have color filter material which is exposed to the light from the screen before the light reaches the photosensitive material. There is a red, green, and blue tube inside of the cathode ray picture tube corresponding to the primary colors. If the cathode ray picture tube's back part is made of metal, a glass portion inserted into the metal may carry the terminals of the photoelectric tube to the outside of the tube.

Figure 11:
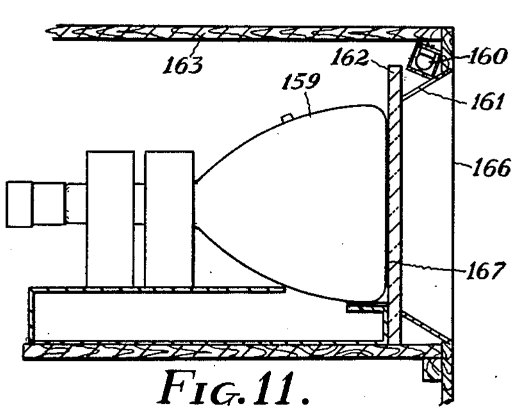
Fig. 11 is a reduced interior sectional view of a television receiver showing a method of mounting the photoelectric tubes in front of the cathode ray picture tube out of the way of the viewer.
Figure 12:
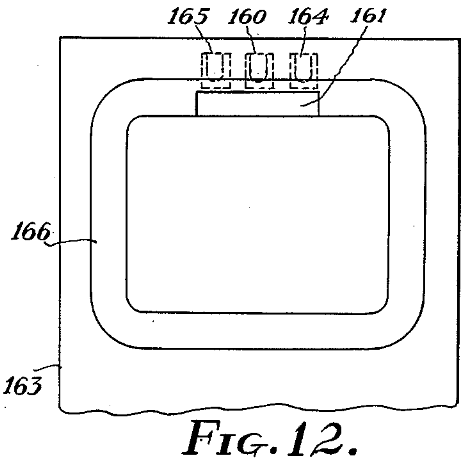
Fig. 12 is a front view of Fig. 11.

The photoelectric tubes can be placed in any position where they will receive the light from the picture screen. If the light is received from the back of the screen the arrangements described hereinabove are satisfactory. If the color producing phosphor screen is aluminized it should be done to the extent where at least some light is emitted to operate the light sensitive devices. These devices may take any of the well known forms sometimes referred to as phototubes. The electron multiplier type may be used for greater sensitivity when it is required. The light sensitive devices can be placed in front of the cathode ray tube out of the way of the viewer. Figures 11 and 12 show how this may be done. The photoelectric tubes with light filters 160, 164, 165 are placed in the forward upper portion of the television receiver cabinet 163. There is an opening 161 in the frame 166 to allow the light, from the screen 167 of the picture tube 159, which goes through the glass 162, to reach the photoelectric tubes. The latter are connected to their respective amplifiers by suitably shielded electrical conductors not shown.

On the other hand, the photoelectric tubes may be used in a projection television system in which the projection picture tube may have a color phosphor screen such as that illustrated in Figures 5, 6, and 7. Fig. 13 illustrates how this is done. Cathode ray picture tube 168 has an image on surface 169 which is projected onto translucent screen 170 by lens 179 and reflector 171. The light partially reflected by the screen 170 is picked up by the photoelectric tubes 172. Another way of doing this is to use a standard cathode ray projection picture tube which will give a white picture, and have a translucent screen 170 with colored transparent portions thereon which may be arranged substantially in the horizontal direction similar to the arrangement of the color phosphors indicated in Figures 5, 6, and 7. The photoelectric tubes 172 will have reflected onto them light of various colors depending upon where the white spot on the white light producing phosphor of the picture tube is projected by the lens 179 and reflector 171. The deflection system for color control is similar to that described hereinabove as well as is described further hereinbelow. In Fig. 13 the dotted lines indicate the path of the light rays through the optical system.

Figure 14:
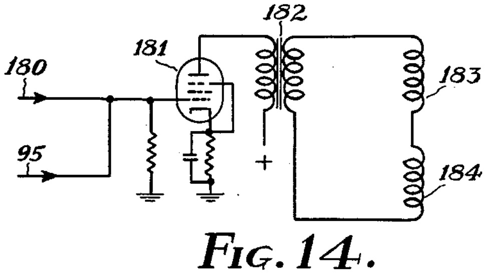
Fig. 14 is a circuit diagram to the vertical deflection coils showing the method of wiring the color controlling circuits thereto.

In the color controlled vertical deflection system described hereinabove auxiliary deflection electrodes were shown for the field and line sequential systems. The dot sequential system may use similar but horizontal deflection electrodes. An alternative arrangement is to dispense with the auxiliary deflection electrodes shown in Fig. 1 and use the regular vertical deflection magnetic system illustrated in Fig. 14 with color control voltages superimposed thereon. In this case the regular vertical deflection voltages are supplied on conductor 180 from the vertical deflection generator. Conductor 180 is connected to the control grid of driver tube 181 which drives the vertical deflection coils 183, 184 through output transformer 182. Conductor 95 is tied to conductor 180. If tubes 137 and 139 shown in Fig. 2 are changed to pentodes the loading effects of conductor 95 on conductor 180 will be lowered. In Fig. 1 conductor 95 is shown connected to amplifier 173. When the circuit of Fig. 14 is used conductor 95 is not connected to the control grid of tube 108 but connected to conductor 180 shown in Fig. 14. Fig. 14, when used, is contained in the box indicated as the vertical deflection amplifier 47 in Fig. 1. When using the circuit of Fig. 14 vertical deflection coils 183 and 184 should be made with fewer turns so that higher frequencies can be accommodated and a driver tube 181 of greater current handling capacity is needed. The color control voltages from conductor 95 are superimposed on the regular vertical deflection voltages and the result is that the current going through coils 183 and 184 is decreased from its value due to the regular deflection voltages on conductor 180, to cause a relative upward color control movement of the electron beam, and the current through the coils is increased to cause a relative downward movement of the electron beam for color control, or vice versa.

Figure 15:
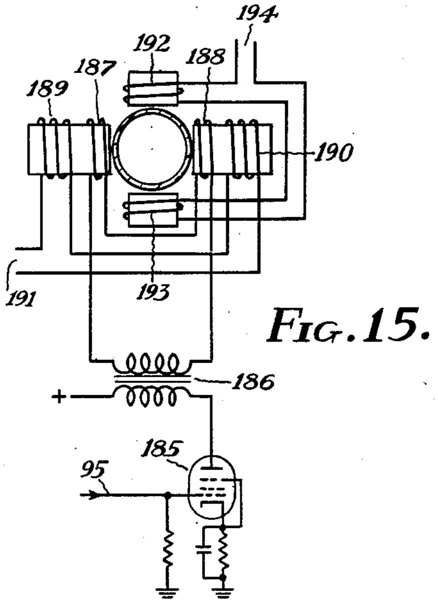
Fig. 15 is a wiring circuit for the deflection yoke showing auxiliary vertical deflection coils for color control.

Another variation of this method which dispenses with auxiliary deflection electrodes is the circuit shown in Fig. 15. Conductor 95 is then connected to driver tube 185 whose output is fed to transformer 186 which is coupled to the auxiliary vertical deflection coils 187 and 188 for color control. Regular vertical deflection coils 189 and 190 are indicated connected to conductors 191 which are operated from the regular vertical deflection amplifier such as is designated as box 47 in Fig. 1. The regular horizontal deflection coils 192 and 193 are connected to conductors 194 which are operated from the regular horizontal deflection amplifier shown as box 44 in Fig. 1.

Figure 16:
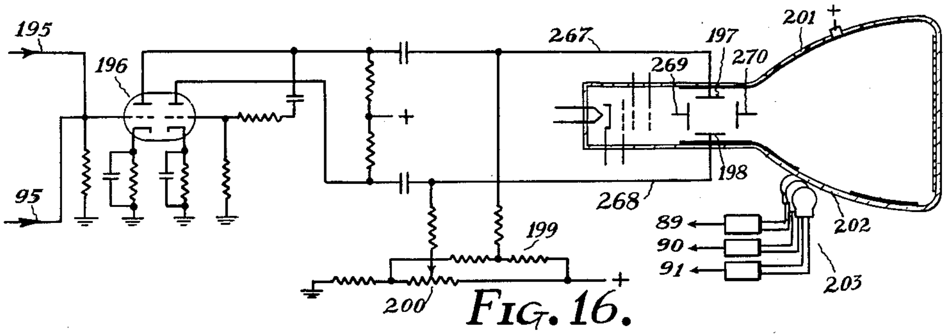
Fig. 16 is a circuit diagram of a standard electrostatic deflection system showing wiring to the deflection plates and the method of connecting the color control circuit.

When the cathode ray picture tube uses the electrostatic deflection method, the circuit shown in Fig. 16 may be used for color control. Color control conductor 95 is connected to amplifier 196 which gives a push-pull output and is similar in operation to amplifier 173 shown in Fig. 1. Conductor 195 from the vertical deflection generator is also connected to amplifier 196. Amplifier 196 is the regular vertical electostatic amplifier used in the deflection system, and conductor 95 tied to conductor 195 permits the color control voltages to be superimposed upon the regular vertical deflection voltages in a manner similar to that described in connection with Fig. 14. The output of amplifier 196 is applied to the regular vertical electrostatic electrodes 197 and 198. Resistance network 199 and potentiometer 200 are typical standard biasing and vertical adjustment means used for this type of system. Cathode ray picture tube 201 may have transparent portion 202 to allow light from the color screen to pass to the photoelectric tubes generally represented by 203. The color filters of these tubes may be part of their glass envelope. They are connected to circuitry such as is described hereinabove and further variations of such circuits as is described hereinbelow.

The gate circuits described in connection with Fig. 1 may be designated as being of the type that are normally off, and a positive voltage is necessary to turn them on. Fig. 17 shows an alternative switching network in which the gates are normally on and a negative voltage is used to turn them off. The switching network of Fig. 17 uses a ring circuit in which each stage has one tube instead of two as in the network of Fig. 1. Referring to Fig. 17, conductor 59 with the synchronized pulses is applied to ring driver 204 which driver the ring circuit consisting of stages 205, 206, and 207. When a stage is in the operative condition a negative voltage is placed on one of the corresponding conductors 208, 209, and 210. These conductors are applied to a rectifier matrix generally represented by 211. Assume that stage 205 is in the operative condition. Then a negative voltage will be placed on conductor 208. Each of the rectifiers in the rectifier matrix 211 passes negative voltage in the direction from left-to-right. The negative voltage on conductor 208 will go through rectifiers 213, 215, 217, and 222. Then this negative voltage will appear on conductors 224, 225, 226 and 229. The negative voltage will turn off downward gate 230, upward gate 231, downward gate 232, and upward gate 235. The only gates remaining on are upward gate 233 which causes the electron beam to move upward when the beam strikes a blue producing zone of the phosphor screen, and downward gate 234 which causes the beam to move downward when green light is produced. This is exactly the condition which is necessary to maintain the electron beam on the red emitting portions of the screen, when the phosphor strips are laid out as shown in Fig. 6. Stage 205, when operated, thus permits production of red light only. When stage 206 of the ring circuit is operative negative voltage will be applied to conductor 209, through rectifiers 214, 216, 218, and 221, to conductors 225, 226, 227, and 228, turning off gates 231, 232, 233, and 234, and leaving on downward gate 230 for movement of the beam downward due to red light, and upward gate 235 for movement of the beam upward due to green light, thus setting up the condition for the movement of the beam towards the blue producing areas of the screen. When stage 207 of the ring circuit is operative negative voltage is applied to conductor 210, rectifiers 212, 219, 220 and 223, to conductors 224, 227, 228, and 229, turning off gates 230, 233, 234, and 235, and leaving on upward gate 231 for control of upward movement of the electron beam when red light is emitted, and leaving on downward gate 232 for downward movement of the electron beam when blue light is emitted, thus setting up the condition for the movement of the electron beam towards the green producing areas of the screen. The outputs of these gates are fed to conductors 92, and 93 which are applied to amplifier 176 and reversing amplifier 177 whose common output is fed to conductor 95 as in Figures 1 and 2.

Figures 18, 18A:
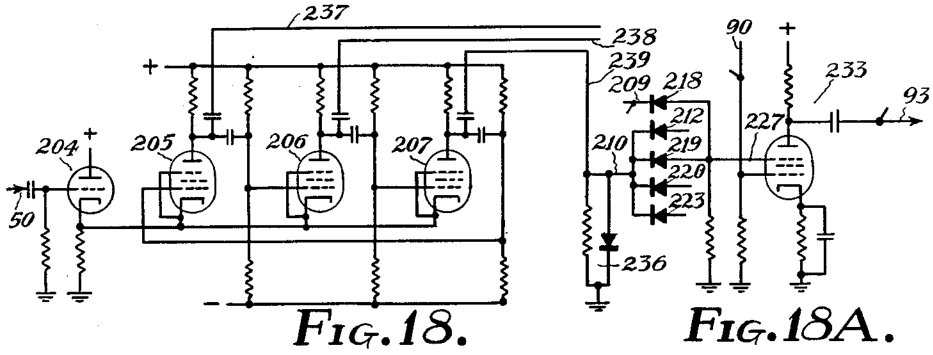
Fig. 18 is a detailed circuit diagram of the ring circuit and driver of Fig. 17.
Fig. 18A is a tube gate circuit for Fig. 17.

Fig. 18 gives details of the components in the boxes of Fig. 17. Conductor 59 is connected to the grid of cathode follower 204 whose cathode is tied to the cathodes of pentode tubes 205, 206, 207 each of which together with a clamping circuit such as 236 constitute a stage referred to in the description given for Fig. 17. This ring circuit operates in a manner similar to the ring circuit of Fig. 2. For example, when tube 207 is conductive, during the cyclic operation, a negative voltage is applied to conductor 239, which is connected to conductor 210. The clamping circuit allows a stronger negative voltage to become established on conductor 210 than would be the case without it. As shown in Fig. 18A of the various rectifiers connected to conductor 210 only one is connected through, namely 219, as an illustrative example. The others are connected in a similar manner to corresponding circuit components. Rectifier 219 connects to conductor 227 which is tied to the suppressor grid of gate tube 233 which is gate 233 of Fig. 17. The control grid of tube 233 is connected to conductor 90 which receives the output of amplifier 84 which is supplied by blue color control voltages from the blue photoelectric tube. Tube 233 will normally pass and amplify the color control signals applied to its control grid. If a negative voltage is placed on its suppressor grid via the rectifier 219 and conductor 227 it will prevent amplification or any passage of signals from its control grid to its output conductor 93. Figs. 18 and 18A show detail connections for stage 207 to gate 233. The connection of this stage to other gates as well as the connection of the other stages to the other gates is similar. Fig. 17 gives the overall circuitry.

Fig. 19 illustrates a simpler form of gating circuit which may be substituted for the gate such as 233 of Fig. 18A. In Fig. 19 rectifier 240, which conducts in the direction from left to right, is biased by a positive voltage applied through resistors 241 and 242 which causes a current to flow through the rectifier and through resistor 243 to ground. Color control signals will normally pass through the rectifier from conductor 90 to conductor 93. If a keying negative pulse is applied to conductor 227 the positive bias voltage applied to the rectifier is neutralized and in addition a negative voltage is substituted which prevents the rectifier from conducting. The signal amplitude in its negative direction should not exceed the positive bias voltage at the rectifier, and the positive signal amplitude should not exceed the net negative voltage applied to the rectifier by the keying pulse.

Figure 25:
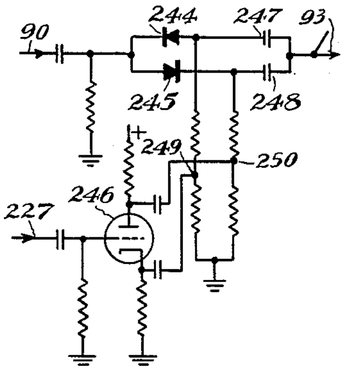
Fig. 25 is a balanced gating circuit applicable to the systems of Fig. 22 and Fig. 17. This circuit normally allows the passage of feedback control voltages.

Another gating circuit which may be substituted for gate 233 in Fig. 18A is the balanced gating circuit illustrated in Fig. 25. In this circuit the rectifiers normally have no biasing voltage placed on them. Rectifier 245 conducts positively in the left-to-right direction, while rectifier 244 conducts in the opposite direction. Color control signals from conductor 90 will be passed on by the rectifiers to conductor 93. Rectifier 244 passes the negative parts of the signal, while rectifier 245 passes the positive parts of the signal. The keying negative pulses are applied to the control grid of tube 246 via conductor 227. When a keying negative pulse is present negative voltage will be placed at point 249 which is the junction of two resistors one connected to ground, the other to rectifier 244. and a positive voltage is placed at circuit point 250 which is the junction of two resistors, one connecting to ground and the other to rectifier 245. These voltages will cause the rectifiers to become non-conductive since they are applied in reverse to the conductive direction. The keying voltages are larger in value than the signal amplitude. Therefore, the rectifiers will be blocked and no signals will pass through them. The keying pulses applied to the rectifiers will also be applied to condensers 247 and 248 but since the voltages are equal in amplitude but opposite in phase, they will cancel insofar as their net effect on conductor 93 is concerned. In this manner the keying pulse is prevented from entering the color control circuit.

Figure 20:
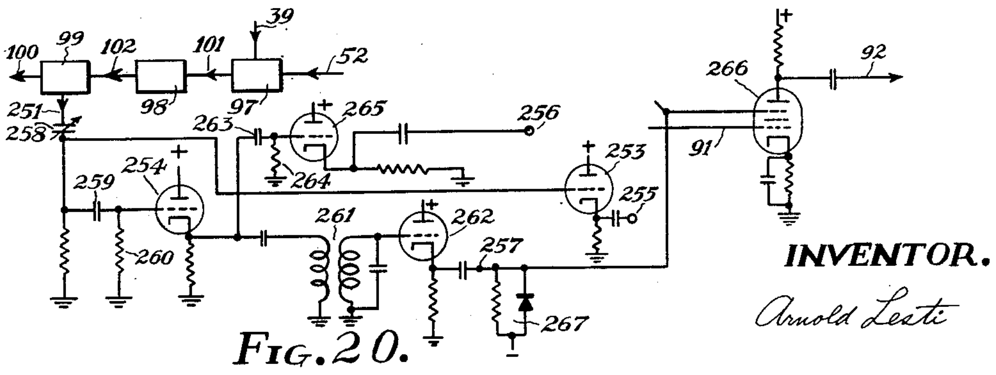
Fig. 20 is a circuit for use with the dot sequential system for producing gating control voltages on three separate outputs each 120° displaced from the adjacent one.

In the description given hereinabove in connection with Fig. 20 for the dot sequential system conductor 100 was specified to operate the ring circuit driver by being connected to conductor 50, Fig. 1. Ring circuits which can operate at the pulse rates required for the dot sequential system are difficult to realize. Fig. 20 illustrates another method of providing the keying voltages for the gates. Conductor 100 is not connected to conductor 50, and the ring circuit is not used. The frequency of the color synchronizing voltages which may be placed in bursts on the back porch of the horizontal synchronizing pedestal is one-third of that needed for the previous case. Tuned circuit 98 in this case is tuned to one-third of the previous frequency. The output of amplifier 99 is applied to condenser 258 via conductor 251. This condenser is connected to cathode follower tubes 253. The output of tube 253 is applied to terminal 255. The voltage at this latter point is sinusoidal at the color synchronizing frequency and its phase is adjusted by variable condenser 258. Condenser 258 is also connected to a retarding network consisting of condenser 259 and resistor 260 which deliver a sinusoidal voltage wave to the grid of tube 254 which is 60° retarded from that delivered at terminal 255. The output of tube 254 is fed to a retarding network consisting of condenser 263 and resistor 264 which deliver a sinusoidal wave to the grid of cathode follower tube 265 which is 60° retarded from that at the output of tube 254. The output of tube 265 is applied to terminal 256 which has a sinusoidal voltage wave retarded 120° from that at terminal 255. The output of tube 254 is also applied to transformer 261 whose output reverses the phase thereby retarding the voltage by 180°. This is applied to cathode follower 262 whose output at terminal 257 is 240° retarded from the voltage at terminal 255 and 120° retarded from that at terminal 256. The entire phase may be shifted relative to that at conductor 251 by varying the capacity of condenser 258. Of the terminals 255, 256, 257, only 257 is shown connected to the suppressor grid of its associated tube 266, which functions in a manner similar to tube 122 shown in Fig. 2. The other terminals 255, and 256 are similarly connected to their respective tubes. A clamping circuit 267 consisting of a rectifier and resistor shifts the voltage wave at terminal 257 and to the suppressor grid of tube 266 in a direction entirely positive with respect to negative bias at the clamping circuit. The negative bias voltage is set to cause the plate current cut off of tube 266 until the voltage wave from cathode follower 262 swings sufficiently in the positive direction to cause tube 266 to conduct and thereby allow the passage of color control signal from conductor 91 to conductor 92. Gating circuits such as those shown in Fig. 3 and Fig. 4 may be used instead of tube 266. In case the circuit of Fig. 4 is used conductors 141 and 142 should be reversed. The circuit of Fig. 4 is advantageous for the dot sequential system because keying pulses are prevented from entering the color feedback circuit. The result of using the circuit of Fig. 20 is that the color control gates such as these shown in Fig. 1 are turned on and off in succession as the video signal into the cathode ray picture tube changes its color information to that corresponding to the color permitted to be emitted by the gating circuits. Accurate overall phasing is set by condenser 251. Of course, it is possible to use a circuit similar to that shown in Fig. 17 but with no ring circuit for gating. In this latter case the bias and rectifier of the clamping circuit 267 of Fig. 20 would be reversed, and the gate circuits illustrated in either Fig. 19 or Fig. 25 may be used. Switch 103 of Fig. 20 need not be used when the ring circuits are not used.

Figure 21:
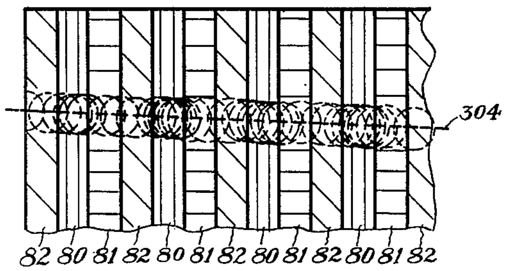
Fig. 21 is an enlarged view of adjacent vertical color producing phosphor strips showing the path of the electron beam when using the horizontal deflection color control system.

For the dot sequential system it is preferred to use the controlled feedback principle with a phosphor screen using vertical color emitting contiguous areas such as are illustrated in Fig. 21 and Fig. 23. For this system the circuit of Fig. 1, for example, will use deflection electrodes similar to 66 and 67 but turned around 90° so as to constitute auxiliary horizontal deflection electrodes. Likewise, Fig. 14 when applied to the dot sequential system, will represent a horizontal deflection coil system, and Fig. 15 would use auxiliary coils such as 187 and 188 wound alongside the horizontal coils 192 and 193 for auxiliary horizontal deflection control. Similarly, for the dot sequential system the conductor 267 and 268 in Fig. 16 would be disconnected from vertical deflection electrodes 197 and 198 and connected to horizontal deflection electrodes 269 and 270.

For the dot sequential system let motion from left-to-right of the electron beam correspond to downward motion for the other systems, and let motion from right-to-left correspond to upward motion. This established the sense of all of the color gates in the switching circuits for the dot sequential system. This correspondence is fixed by the spatial sequence of the parallel color producing phosphor strips illustrated in Fig. 21 which have the same order from left-to-right that the strips of Fig. 6 have from top-to-bottom. Under these conditions the operation is analogous. Referring to Fig. 21, when the horizontal motion starts on the left side of the screen assume that at that instant the gates are set for the red color, the first strip shown is green 82; therefore, the horizontal deflection system will be given additional voltage to aid the already existing horizontal motion to such an extent that the electron beam will very quickly move from left-to-right away from the green area 82 towards the red light emitting area 80. When the beam reaches the red light producing area it will travel at normal horizontal speed and emit red light. If the right portion of the beam starts moving into the blue emitting region 81, while the color controlling gates are still set for the red color, the small amount of blue light emitted will establish a control voltage through the gates which will be applied to the horizontal deflection system in opposition to the horizontal motion and tending to move the beam in the direction from right-to-left causing it to stay on the red light emitting region 80. If the width of the beam is larger than the width of a color producing strip, the beam will tend to center on the red color if the gates are set for the red color, and the small amount of light emitted by the green and blue areas produces opposing voltages which tend to keep the beam on the red area.

The color information is transmitted in time sequence, by way of example as red, blue, green, red, blue, green, and etc. This is the same as the spatial order from left-to-right of the colors produced in the contiguous phosphor areas illustrated in Fig. 21 and Fig. 23. The number of these areas should be approximately equal to three times the number of horizontal dots that the system will take care of. The blue color is switched on after the red, and since the color producing area for the blue color lies immediately to the right of the red color producing area, the beam will be caused to speed up and move quickly into the blue emitting area, and when it reaches this area it will tend to stay there by the action of the green producing area which will oppose any motion into itself. In a similar manner when the green color is switched on, the beam will move quickly by the shortest path to the green emitting area, and so on. This method is recommended for the dot sequential systems but not for the line or field sequential systems, although it will operate for all systems and can be used when wide frequency bandwidth in the color control circuits is not objectionable. If the line and field sequential systems are used with this horizontal deflection control method the color deflection circuit must be suppressed periodically for a very short interval of time at a frequency equal to the dot rate across the horizontal line. This will permit the regular horizontal deflection circuit to orient the beam in the proper positions on the horizontal line prior to color positioning. The suppression may take place at conductor such as 95, for example. Of course, this method is not recommended for the line and field sequential systems since these latter methods may operate efficiently with vertical deflection color control as described hereinabove. Periodic suppression may be used with some forms of dot sequential systems where dot interlace is also used. Suppression may be accomplished by inserting in series with conductor 95 a gate such as that shown in Fig. 25 which normally conducts and then applying short pulses at conductor 227 for quick suppression. The electron beam will then quickly move to a new position determined by the regular picture scanning system. When suppression is removed the color control will cause the beam to quickly move into the correct color emitting area in which it will stay until the next suppression pulse occurs. In Fig. 21 the dotted circles centered on dotted line 304 represent concentration of the beam on the red emitting areas 80, which is applicable to the field and line sequential systems. For the dot sequential the concentration would be on each strip in succession.

A further variation of color control by feedback on a light beam which does not use the electron beam deflection system is illustrated in Fig. 22. This method uses feedback around the video amplifier 271 which is driven by the output of the second detector 272 via conductor 273. The second detector is fed from conductor 274 from the picture intermediate frequency amplifier. The output of video amplifier 271 is applied to the control grid of cathode ray picture tube 275 which is equipped with a phosphor color producing screen 276, Fig. 23, and illustrated also in Fig. 24, and similar to that illustrated in Fig. 21. There is a transparent portion 277 of picture tube 275 to allow light from the phosphor color screen to reach the light sensitive photoelectric tubes generally represented by 278. These photoelectric tubes have color filter glass envelopes, one for red, blue, and green light. The output of the green photoelectric tube is applied to amplifier 279, conductor 282, and gate 287. The output of the blue photoelectric tube is applied to amplifier 280, conductor 283 and gate 286, and the output of the red photoelectric tube is applied to amplifier 281, conductor 284, and gate 285. The combined outputs of the gates is applied to amplifier 288 whose output, in turn, is applied to the input circuit point 273 of video amplifier 271. The amplifier 288 is phased in such a way that the voltage it applies to the input of amplifier 271 cancels, opposes, or subtracts, the input voltage which when amplified by amplifier 271 produces increasing light in the cathode ray picture tube screen. The circuit from the input of amplifier 271, its output 289, the electron beam, the light, the photoelectric tubes, gates, amplifier 288, and back to the input 273 of amplifier 271 constitute an inverse feedback path which, when closed, greatly reduces the gain from input 273 to output 289 of amplifier 271. Therefore, the closure of the feedback path will cause a very small amount of light to be emitted by the picture tube screen. On the other hand, when the inverse feedback path is opened, either at the gates or at the photoelectric tubes, the gain amplifier 271 is larger and hence a strong light will be emitted by the cathode ray picture tube screen.

The synchronizing pulses are applied to conductor 290. These are fed to ring driver 291 which causes the ring circuit generally represented by 295 to step along every time a pulse is delivered to it in a manner similar to that described herein above in connection with the other ring circuits. Assume that stage 292 is operative, then a negative voltage is applied to conductor 296. This will block gate 285 and open the photoelectric tube circuit path of the red photoelectric tube. Ring circuit 295 is similar to that illustrated in Fig. 18. Since stage 292 is operative gate 285 is the only one of the three gates that is blocked. Therefore, an inverse feedback path will exist for the blue and green colors when they are emitted by the screen, but not for the red color even when it is emitted. Cathode ray picture tube 275 is given standard vertical and horizontal deflection voltages applied at terminals 299 to box 300 which contains the deflection yoke and focussing coil. As the beam sweeps the screen in the horizontal direction, illustrated by 301 in Fig. 24, it will sweep across each of the red, blue, and green phosphor producing areas in succession since these areas are laid out in the vertical direction. When the beam strikes the red emitting region it will produce red light if there is signal modulation and this light will be the full amount which can be expected. When the beam strikes the blue producing region or green producing regions, if stage 292 is operative, an inverse feedback path is established through the green and blue light path, amplifiers 279, 280, gates 286, 287, amplifier 288 and to circuit point 273. This inverse feedback path goes around amplifier 271 greatly reducing its gain, thereby greatly reducing the intensity of the electron beam and thus permitting the emission of very little blue and green light. Therefore, red light is the only one that can be emitted with full intensity when stage 292 is operative. Gates 285, 286, and 287 are similar to gates shown in Figures 18A, 19, and 25. In a similar manner, when stage 293 is operative it will place a negative voltage on conductor 297 and block gate 286, so that the only feedback paths closed are those due to the green and red light, and these colors will be suppressed while the blue color is permitted to be produced. Also, when stage 294 is operative, conductor 298 is given a negative voltage and gate 287 is blocked, opening the feedback path for the green light and keeping it closed for the red and blue light so that green light is produced strongly while red and blue light is suppressed. This action continues as the stepping action continues. Of course, the field, line, or dot sequential systems may be used with this scheme with the corresponding gating and ring circuits as well as the alternative switching circuits for these various systems described hereinabove.

In the description given hereinabove on the time sequence of the colors, and on their corresponding spatial arrangement on the screen surface of the picture tube it was assumed that the sequencing of the colors is as follows: Red, blue, green, red, blue, green, and etc. It is obvious that the color sequencing could also be red, green, blue, red, green, blue, and etc., with corresponding spatial relations on the screen. The switching circuits of Figures 1 and 17 may be operated by either one of the following tables.

| | R | B | G | | R | G | B |
|---|---|---|---|---|---|---|---|
| R | 0 | Up | Down | R | 0 | Up | Down |
| B | Down | 0 | Up | G | Down | 0 | Up |
| G | Up | Down | 0 | B | Up | Down | 0 |

The table on the left shows the relations in accordance with the circuitry and descriptions given hereinabove. The left side column with letters, R, B, G, represents the red, blue, and green colors respectively for the corresponding row and are the colors represented by the color synchronizing pulses and are the orders of color required of the picture tube. The top row has letters which represent columns which correspond to color emitting areas of the screen. The junction of the rows and columns give the action to be taken by the beam occupying a color area given by the column for an order given by the row. For example, with an order of B or blue color to be produced, the R or red color producing areas will require the beam to move down, the B or blue color producing areas do not affect the beam, while the G or green color producing areas will require the beam to move up. Other columns and rows are interpreted similarly. The table on the right represents another possible method of sequencing the colors and gives the orders for the movement of the beam so the screen will emit the proper colors. This table is similar to the other except that the blue and green colors are interchanged. When color control on the horizontal deflection circuit is used instead of the vertical, the word "down" is replaced by "left-to-right," and the word "up" is replaced by "right-to-left:" otherwise, the tables are similar. Of course, the tables require that the spatial sequencing of the color emitting areas on the screen corresponds to them.

When color control is exercised by the vertical deflection method for the field sequential and line sequential systems the frequency bandwidth that must be taken care of by the auxiliary deflection amplifiers gating circuits and deflection system is substantially equal to the bandwidth required by a regular horizontal deflection system. The phosphor used in these color systems should be of the short persistence type. The color correction waveform will have most of the energy concentrated in the horizontal repetition frequency. The number of color corrections per horizontal line needed will not be incompatible with the persistence time of fast phosphor. For the line sequential system the light should preferably be decayed to a small fraction of its full value during the period of about ten microseconds of horizontal flyback time. For the field sequential system the phosphor may have greater persistence. It is to be noted that the phosphor emits light quickly when bombarded by the electron beam, thus permitting quick start of color corrections. Persistence in emitting light after the beam is moved will have after effects on the color control circuit. For example, with vertical deflection color control, if the gate circuits are set for the blue color and the beam starts on the red color producing strip, the red light will be emitted quickly and the beam will start moving quickly into the blue producing region. Persistence of light emission by the red producing area will cause part of the lower section of the beam to move into the green producing area to a greater extent than it would without persistence, but the green area starts to emit green light quickly, thus producing a quick correction to the extra movement, tending to keep the beam in the blue region. This over correction will subside when the red light is no longer emitted. The required blue light is produced, however in substantially the same brightness than if color persistence of the red color emitting area had not been present. This argument also applies to the operation of color persistence immediately after the flyback time. The same argument applies to the color control method using the horizontal deflection circuit, although for this latter method the phosphors should be preferably of the shortest persistence time amounting to practically no phosphorescence of the luminescence color emitting area, but substantially complete fluorescence. The same applies to the screen material for the method illustrated in Fig. 22.

The effects of integration of the color control voltages due to reduced bandwidth of the system as a whole will cause the system to act like what in the art is called automatic-volume-control. That is, the gain or magnitude of the transfer function from the electron beam intensity to the light produced by the electron beam will be varied by the electron beam as it moves off of a color producing strip by a deflection force which is the result of the integration. This action will cause less color control for weak modulations of the electron beam. A high gain amplifier in the photoelectric tube circuits will permit color control for the electron beam of very low intensity. It may be noted, in this connection, that the eye is not sensitive to colors of very weak intensity. Reduction of integration and increase of frequency bandwidth capabilities in the color control circuits will reduce the lowering of control at low beam intensities. Integration or reduced frequency bandwidth in the color control circuits is not feasible with the method illustrated in Fig. 22. This method requires a wide frequency bandwidth around the feedback loop. The same is true of the method illustrated in Fig. 21. Of course, as is well known to the art regarding feedback circuits, specific conditions can be met to avoid oscillations around the feedback loop.

From the description of the method and system given hereinabove it can be readily understood that a color television receiver is feasible based on controlling the electron beam towards those portions of the color screen which have the required color emitting property. The system may be adapted to operate with any combination of two or more primary colors by themselves or combined with a black-and-white component. While the various color screens described hereinabove are indicated as substantially horizontal and parallel contiguous strips, or vertically disposed parallel strips, this is shown as the preferred form, but it is to be understood that the color strips may be oriented in other directions and a color control deflection system may be used to match the direction of the color areas. The color emitting areas of the screen need not be parallel strips, but they can take the form of dots or checkerboard color emitting areas.

Good electron beam focussing throughout the entire screen area is preferred for this color receiving system. The diameter of the electron beam spot on the screen should be preferably about equal to the width of a color strip. In the case where horizontal color strips are used, and if a picture tube with a screen height of fifteen inches is used by way of example, with 1500 phosphor color strips laid out horizontally, a beam diameter of about ten-thousandths of an inch would be required. It is to be noted in this connection, that in standard black and white picture tubes, there exist large horizontal areas of the picture tube screen, between the light emitting lines, which are not used at all. In the present color television system these areas are occupied by the momentarily inactive color strips.

While I have described above the principles of my invention in connection with specific apparatus, it is to be understood that this description is made only by way of example and not as a limitation to the scope of my invention.

I claim:

1. A color television receiver comprising a signal receiver, a cathode ray picture tube having a luminescent screen with three sets of contiguous areas thereon with each set of areas adapted to emit light of one of the three primary colors when struck by the electron beam and the set of areas are arranged in substantially vertical strips and the color of the light emitted by any one strip being different from that emitted by adjacent strips, three photoelectric tubes each with an associated color filter for each of the three primary colors, means for allowing the light from the screen to reach the photoelectric tubes through their associated filter, a vertical and horizontal deflection circuit with means to deflect the electron beam for picture scanning, gate means adapted to be switched to pass or block signals from the photoelectric tubes, means to superimpose left-to-right or right-to-left motion on the electron beam in accordance with the switching of the gate means, means for switching the gate means for each color in sequence and repetitively by color synchronizing signals from the signal receiver whereby superimposed motion on the electron beam is from left-to-right if the beam strikes the color emitting strip immediately to the left of the color emitting strip for which said color synchronizing signals are set and the superimposed motion on the electron beam is right-to-left if the electron beam strikes the color emitting strip immediately to the right of the color emitting strip for which said color synchronizing signals are set.

2. A color television receiver comprising a signal receiver, a cathode ray picture tube having a luminescent screen with substantially parallel areas arranged in sets there being one set for each of the primary colors and each set is adapted to emit light of one of the primary colors when struck by the electron beam, a light sensitive device and associated color filter for each of the primary colors, gate means adapted to be switched to pass or block signals from each light sensitive device and consisting of an upper and a lower gate for each circuit path of each light sensitive device and each gate is adapted to pass control voltages from the circuit path, a first output connected to the outputs of all of the upper gates, a second output connected to the outputs of all of the lower gates, means for reversing the phase of the second output with respect to the first, means for combining the first output with the reversed phase of the second output, a vertical and horizontal deflection circuit with means to deflect the electron beam for picture scanning, means for allowing the light from the screen to reach the light sensitive devices, means for switching the gate means by synchronizing signals from the signal receiver in accordance with the color representation of such signals, and means to superimpose deflection motion on the electron beam in accordance with the combined first output with the reversed phase of the second output of the gate means thereby causing the electron beam to move to those portions of the screen which emit light whose color is in accordance with the said synchronizing signals.

3. A color television receiver comprising a signal receiver; a cathode ray picture tube having a luminescent screen with substantially parallel areas arranged in sets there being one set for each of the primary colors and each set is adapted to emit light of one of the primary colors when struck by the electron beam, a light sensitive device and associated color filter for each of the primary colors, means for allowing the light from the screen to reach the light sensitive devices, a vertical and horizontal deflection circuit with means to deflect the electron beam for picture scanning, gate means consisting of an upper and a lower gate for each of the outputs of the light sensitive devices and adapted to normally pass their signals, a ring circuit with three stages to switch the gate means by synchronizing signals, four rectifiers connected to each stage and adapted to pass pulses from the operated stage to two upper and two lower gates to block the same and allow the other gates to pass signals responsive to light of the colors which differ from the color representation of the synchronizing signal, and means to superimpose deflection motion on the electron beam in accordance with the output of said gate means thereby causing the electron beam to move to those portions of the screen which emit light whose color is in accordance with the said synchronizing signals.

4. A color television receiver comprising a signal receiver, a cathode ray picture tube having a luminescent screen with substantially parallel areas arranged in sets there being one set for each of the primary colors and each set is adapted to emit light of one of the primary colors when struck by the electron beam, a light sensitive device and associated color filter for each of the primary colors, means for allowing the light from the screen to reach the light sensitive devices, gate means consisting of an upper and a lower gate for each of the outputs of the light sensitive devices and adapted to normally block their signals, a ring circuit with three stages to switch the gate means by synchronizing signals, a vertical and horizontal deflection circuit with means to deflect the electron beam for picture scanning, means for applying the output of each stage to an upper and a lower gate to allow these gates to pass signals responsive to light of the colors which differ from the color representation of the synchronizing signal and permitting the electron beam to be deflected towards those portions of the screen which emit light whose color is in accordance with such synchronizing signal.

5. A color television receiver comprising a signal receiver, a cathode ray picture tube with a luminescent screen having separate portions thereon for each of the primary colors and each portion is adapted to emit light of one of the primary colors when the electron beam strikes it, means to deflect the electron beam for picture scanning, light sensitive devices with associated primary color filters responsive to the light from the screen, gate means adapted to be switched to pass or block signals from each light sensitive device, means for switching the gate means by synchronizing signals from the signal receiver in accordance with the color representations of such signals, a video amplifier adapted to pass normal picture signals to the cathode ray picture tube, and means for applying the color control signals which are passed by the gate means to the input of the video amplifier whereby an inverse feedback path is established to decrease the electron beam intensity when the beam strikes those portions of the screen for which the color signals of the responsive light sensitive devices are passed by the gates but to allow full beam intensity when the beam strikes those other portions of the screen and which emit a color in accordance with the said synchronizing signals.

6. A color television receiver according to claim 5 wherein the said separate portions of the luminescent screen comprise substantially vertical contiguous parallel areas.

7. A color television receiver comprising a signal receiver, a cathode ray picture tube with a luminescent screen having separate portions thereon for each of the primary colors and each portion is adapted to emit light of one of the primary colors when the electron beam strikes it, a light sensitive device and associated color filter for each of the primary colors, means for allowing the light from the screen to reach the light sensitive devices, a vertical and horizontal deflection circuit with means to deflect the electron beam for picture scanning, gate means consisting of a gate for each of the light sensitive devices and adapted to normally block the control voltages of the corresponding devices, a ring circuit with a stage for each of the gates and adapted to switch the gates by synchronizing signals to allow those control voltages from the light sensitive devices to pass under the control of colors which differ from the color for which the synchronizing signal is set, a video amplifier adapted to pass normal picture signals to the cathode ray picture tube, and means for applying the color control voltages which are passed by the gates to the input of the video amplifier whereby an inverse feedback path is established to decrease the electron beam intensity when the beam strikes those portions of the screen for which the color signals of the responsive light sensitive devices are passed by the gates but to allow full beam intensity when the beam strikes those other portions of the screen and which emit a color for which said synchronizing signal is then set.

8. A color television receiver comprising a signal receiver, a cathode ray picture tube with a luminescent screen having separate portions thereon for each of the primary colors and each portion is adapted to emit light of one of the primary colors when the electron beam strikes it, a vertical and horizontal deflection circuit with means to deflect the electron beam in the vertical and horizontal directions for picture scanning, a light sensitive device and associated color filter for each of the primary colors, means for allowing the light from the screen to reach the light sensitive devices through their associated color filters, gate means adapted to be switched to pass or block signals from the light sensitive devices, means for switching the gate means by synchronizing signals from the signal receiver in accordance with the color representations of such signals, and means to superimpose horizontal deflection motion on the electron beam in accordance with the output of said gate means thereby causing the electron beam to move to those portions of the screen which emit light whose color is in accordance with the said synchronizing signals.

9. A color television receiver according to claim 8 wherein the said separate portions of the luminescent screen comprise substantially vertical contiguous parallel areas.

10. A color television receiver according to claim 8 wherein the said output of the gate means is interrupted at a high rate of speed in relation to the scanning rate and incapacitated during the interruptions thereby permitting the deflection circuit to direct the electron beam independently of the signals from the light sensitive devices during the interruptions.

11. A color television receiver having a cathode ray picture tube with an electron beam and a luminescent screen with separate portions thereon for each of the primary colors and each portion is adapted to emit light of one of the primary colors when the electron beam strikes it, a vertical and horizontal deflection circuit to deflect the beam in the vertical and horizontal directions for picture scanning, means including an inverse feedback path which utilizes light emitted by the screen as part of the feedback loop to superimpose horizontal motion on the beam when it strikes those portions of the screen which emit light of a color which differs from the color momentarily intended to be emitted, and means to interrupt the said feedback path at a high rate of speed in relation to the scanning rate and incapacitating the feedback action during the interruptions thereby permitting the deflection circuit to direct the electron beam independently of the light emitted in the feedback loop during the interruptions.

12. In a television receiver a switching system adapted to interrupt or allow the passage of signal currents between two circuit terminals comprising a first rectifier to conduct signal currents between the two terminals and biased so that it will normally interrupt the passage of signal currents, a second rectifier also to conduct signal currents between the two terminals but adapted to conduct in the opposite direction to that of the first rectifier and biased so that it will normally interrupt the passage of signal currents and means for applying keying voltages to the rectifiers to render them simultaneously conductive to signal currents whereby a circuit path is established between the two circuit terminals to allow the passage of signal currents but preventing the passage of the keying voltages to the said circuit terminals.

13. In a television receiver a switching system adapted to interrupt or allow the passage of signal currents between two circuit terminals comprising a first rectifier to conduct signal currents between the two terminals and biased so that it will normally conduct the signal currents, a second rectifier also adapted to conduct signal currents between the two terminals but adapted to conduct in the opposite direction to that of the first rectifier and biased so that it will normally conduct signal currents, and means for applying keying voltages to the rectifiers to render them simultaneously non-conductive to signal currents whereby the circuit path is interrupted between the two signal circuit terminals to prevent the passage of signal currents and also prevent the passage of the keying voltages to the said circuit terminals.

14. A color television receiver having a cathode ray picture tube with an electron beam and a luminescent screen with separate portions thereon for each of the primary colors and each portion is adapted to emit light of one of the primary colors when the electron beam strikes it, a signal receiver, a light sensitive device and associated color filter for each of the primary colors adapted to receive light from the screen through its associated color filter, gate means between corresponding pairs of circuit terminals adapted to be switched to pass or block color signals from the light sensitive devices and including one rectifier between each of the corresponding pairs of circuit terminals adapted to conduct in a given direction and another rectifier also between each of the corresponding pairs of circuit terminals but adapted to conduct in the opposite direction to the first mentioned rectifier, means responsive to synchronizing signals from the signal receiver for applying keying voltages simultaneously to both rectifiers between given corresponding pairs of circuit terminals to switch the color signals from the light sensitive devices but preventing the application of the keying voltages into the color signal circuit, and means for utilizing said switched color signals from the light sensitive devices to cause the electron beam to strike those portions of the luminescent screen which emit light of a color in accordance with the synchronizing signals.

ARNOLD LESTI.

References Cited in the file of this patent

UNITED STATES PATENTS

| Number | Name | Date |
|---|---|---|
| 2,415,059 | Zworykin | Jan. 28, 1947 |
| 2,431,115 | Goldsmith | Nov. 18, 1947 |
| 2,490,812 | Huffman | Dec. 13, 1949 |
| 2,545,325 | Weimer | Mar. 13, 1951 |
| 2,568,543 | Goldsmith | Sept. 18, 1951 |